United States Patent
Jóia

(10) Patent No.: US 8,056,644 B2
(45) Date of Patent: Nov. 15, 2011

(54) AGRICULTURAL MECHANIZED SYSTEM FOR PULLING-OFF AND CHOPPING STUBS OF COTTON PLANTS AND SIMILAR AGRICULTURES

(75) Inventor: Antonio Aparecido Jóia, Itapira - SP. Cep. (BR)

(73) Assignee: J. F. Maquinas Agricolas Ltda. (BR)

( * ) Notice: Subject to any disclaimer, the term of this patent is extended or adjusted under 35 U.S.C. 154(b) by 458 days.

(21) Appl. No.: 11/573,433

(22) PCT Filed: Apr. 4, 2006

(86) PCT No.: PCT/BR2006/000062
§ 371 (c)(1),
(2), (4) Date: Feb. 8, 2007

(87) PCT Pub. No.: WO2006/108251
PCT Pub. Date: Oct. 19, 2006

(65) Prior Publication Data
US 2009/0223194 A1    Sep. 10, 2009

(30) Foreign Application Priority Data
Apr. 11, 2005  (BR) ...................................... 0501408

(51) Int. Cl.
*A01D 27/00*  (2006.01)
(52) U.S. Cl. ................ 171/62; 171/24; 171/64
(58) Field of Classification Search ............ 171/58, 171/62, 64, 65, 66, 71, 73, 133, 24
See application file for complete search history.

(56) References Cited

U.S. PATENT DOCUMENTS
1,117,314 A * 11/1914 Blunck .................... 171/24
1,427,931 A *  9/1922 Batla et al. ............... 171/24
(Continued)

FOREIGN PATENT DOCUMENTS
DE         40 35 570 A1    5/1992
(Continued)

OTHER PUBLICATIONS
J. F. Máquinas Agrícolas Ltda., PCT/BR2006/000062 International search report, Jul. 28, 2006, 2 pages.

*Primary Examiner* — Robert Pezzuto
*Assistant Examiner* — Jamie L McGowan
(74) *Attorney, Agent, or Firm* — McKee, Voorhees & Sease, P.L.C.

(57) ABSTRACT

Agricultural mechanized system for pulling-off and chopping stubs of cotton plants and similar agricultures, especially of a agricultural mechanized system coupled to a tractor, to plow and pull off the stubs preferably from the cotton agricultures and similar cultures firmly buried, which comprises a set of plows (10) provided with a pair of cutting wheels (14) and a pair of adjustable plowing blades (16 and 16') between a first position above the ground and a final position of penetration in the ground which is longer than the radicular portion depth of the referred stubs, a chopper set (12) with blades (96) which chop the referred stubs into a particulate material into smaller fragments forming a layer of inert organic matter with at least a stub pulling-off set (11) arranged between the referred plowing set (10) and chopper set (12) mounted upon a support frame (2) on wheels (7 and 8).

9 Claims, 12 Drawing Sheets

U.S. PATENT DOCUMENTS

| | | | | |
|---|---|---|---|---|
| 1,611,825 A | * | 12/1926 | Farrington | 171/43 |
| 2,217,809 A | * | 10/1940 | Padrick | 171/43 |
| 2,302,973 A | * | 11/1942 | Sargent | 172/33 |
| 2,337,355 A | * | 12/1943 | Spell | 171/24 |
| 2,540,264 A | * | 2/1951 | Hitchcock | 56/60 |
| 2,544,025 A | * | 3/1951 | Johnson | 171/24 |
| 2,592,097 A | * | 4/1952 | Younger | 172/58 |
| 2,777,267 A | * | 1/1957 | Thompson | 171/24 |
| 4,015,667 A | | 4/1977 | Ruozi | |
| 4,350,207 A | | 9/1982 | Ben-Dor | |
| 4,588,033 A | * | 5/1986 | Orthman | 171/62 |
| 5,285,854 A | * | 2/1994 | Thacker et al. | 172/176 |
| 6,185,919 B1 | * | 2/2001 | Borchard | 56/14.5 |

FOREIGN PATENT DOCUMENTS

WO    WO 2006/108251 A1    10/2006

* cited by examiner

AGRICULTURAL MECHANIZED SYSTEM FOR PULLING-OFF AND CHOPPING STUBS OF COTTON PLANTS AND SIMILAR AGRICULTURES

BRIEF SUMMARY

This paper deals with the request of Invention Patent for the "AGRICULTURAL MECHANIZED SYSTEM FOR PULLING-OFF AND CHOPPING STUBS OF COTTON PLANTS AND SIMILAR AGRICULTURES" specially of an equipment that provides a mechanized system of pulling-off remains of plants buried in the soil, which when fragmented in particles are expelled under the formation of an inert organic matter layer of soil protection, intended preferably for cotton agricultures, for every type of soil, basically formed by a set of plows, a chopping set to grind stubs into particulate material with a set of stubs pulling-off arranged in-between the referred sets of plows and chopper co-operating among themselves upon a single frame structure.

BACKGROUND OF THE INVENTION

As it is known by the experts in the matter, this is the harvest of the cotton or the plume from the rest of the plant or stub, formed by the stem, branches and the radicular portion. Having a solid consistency, the stub with its radicular portion is firmly buried within the soil due to the entanglement formed by the roots with earth and stones particles, which was developed during the plant growth.

It is also known that the legislations in force both in the Federal level and in the State level as well, rule that the stub should be fully pulled off after the cotton harvest and within a very short period to avoid the re-sprouting and the propagation of insect plagues such as the "Bicudo" (*Anthonomous Gradis*), besides requiring the full pulling-off of the stub from the soil, in which said stub should be completely fragmented in pre-set sizes, otherwise, the floral structure (capsules) could present eggs or the insect itself, larger stub particles could generate an opportunistic germination, a formation of nematodes or fungi in the fragmented radicular system, whether it is buried or not.

The current method used for the destruction of the stubs basically involves three operations, the first one being performed by a cropper provided with blades and blades and vertical axle or horizontal rotating rollers with blades; the second operation is performed by means of a plough intended to pull out the remains with the roots and the third one consists of using a large leveling machine or equivalent apparel to level the soil for the next plantation. This methodology presents several drawbacks among which we point out the following:

Upon the land clearing, since the cut size is not accurate, an entanglement of residue of different sizes remains in the soil which in its turn makes the next step of plowing, harrowing and subsequently, planting harder;

Upon plowing the soil to pull off the remains of the plants with their roots, part of the tree paths are not pulled off and they sprout again, facilitating the propagation of plagues and other nuisances;

The cost of this methodology is very high since distinct operations are performed with the occupation of machinery and labor, and it is not very efficient;

As a supplementary technology for the plagues control, the application of chemical pesticides is always performed based on the plagues sampling by means of control files, then the products Diflubenzuron and Endosulfan are applied diluted at 12% to fight the caterpillar and Endosulfan at 10% to fight the Bicudo insect, and these are forbidden techniques, since they contaminate the groundwater.

THE STATE OF THE ART

In order to cure the many nuisances, several equipment were developed, which have demonstrated to be unable to overcome field incidental difficulties, besides presenting an excessively exaggerated constructive complexity, requiring periodical replacements and maintenances with high overall costs.

U.S. Pat. No. 4,751,812 of Jun. 21, 1988 reveals a machine indicated by reference 10 for the stems cutting, particularly those of cotton stubs, which comprises a frame with a single pair of wheels 36 towed by a tractor, which presents a device that shall pull stems 12 formed by two pairs of rollers 14, 16, 18 and 20, from which at least one roller of each pair is driven by the driving unit around an axle, installed under formation of an acute slope regarding the ground. The stem is restrained and pulled off from the soil by the round surfaces of rollers 14 and 16 which are rollers subject to excessive wear as observed in lines 57-62 of column 2. The stems are fed to the rear of the equipment where the first and second rotating blades devices are located. The stems are cut in a chip-like shape and are ejected from the machine.

As seen in the figures and as learned from U.S. Pat. No. 4,751,812 report the equipment is not provided with plowing blades or with the plowing stage provided with plowing blades and plowing blades which cause the vertical and horizontal cutting from below the radicular portion for their release from soils normally having firm consistency. The rooting problem forming an entanglement of roots with earth as characterized in the radicular portion of the cotton plant is not mentioned nor suggested. Without a previous plowing stage, the radicular portion would not be fully pulled off and therefore, this equipment does not meet the previously commented requirements.

As to U.S. Pat. No. 5,285,854 of Feb. 15, 1994, it reveals an equipment intended for cotton agricultures which opens trenches or ditches and within which the stems and the roots are buried in, since it is considered that the remains of stems over the soil cause the generation of plagues. In fact, this understanding comes from the different approach that does not anticipate the change of the stub into a layer of inert material and therefore, the constructive stages of the machine are not provided for in this invention. Since in this paper there is no concern with the particles size, the burial of the stubs does not eliminate the soil contamination problem.

U.S. Pat. No. 6,185,919 of Feb. 13, 2001 refers to the equipment that removes and cuts the stubs. These stubs are cut by and passed by conjugate feeding rollers which feed a chopper directly. The compression of the plants stems by the feeding rollers increases as the stubs slide between the rollers for a variable interval formed by the feeding rollers. As said patent reveals in lines 49 to 54 in column 1 the stub cutting starts before it has been fully pulled off from the soil, and therefore we may conclude that a radicular portion remains buried in the soil. Therefore, once again, the problem of soil infestation or the purpose of the full pulling-off of the stub and its change into a particulate of inert material is not satisfactory.

U.S. Pat. No. 4,751,812 of Jun. 21, 1998, U.S. Pat. No. 5,285,854 of Feb. 15, 1994 and U.S. Pat. No. 6,185,919 of Feb. 13, 2001 show that besides different alternatives that do not meet the purposes that were mentioned initially, a common particularity to them, which is a conception of the components that intervene in the pulling-off and processing of the complex stubs, which require complicated milling processes, and such components are subject to a severe wear since there is no concern in separating the radicular portion from the stub before it enters the chopping set.

OBJECT OF THE INVENTION

Therefore, one of the purposes of this invention is to provide the selective cutting of the stub with its root in order to avoid the entering of the root into the chopper set and consequently, reducing the life cycle of the cutting devices which wear naturally with the contact with earth and stones.

It is also a purpose of the demanded machine that the assembly of the modules is such that it allows the fast replacement of each one of them with others in the same number, or allows the machine expansion from two to at least six modules, working at least in six lines pulled by a single tractor.

Another purpose of this machine is to provide a machine that is responsive to obstacles that interpose themselves to the cutting devices by means of height adjustment devices and releasing of the cutting elements from their initial assembly position, thus preserving their life cycle.

Besides, this invention is intended to adjust the relative speed of the pulling-off regarding the machine pace in order to achieve an optimization of the operation times.

BRIEF DESCRIPTION OF THE INVENTION

Thus, knowing the incidental problems after the crop, this invention is intended to provide an agricultural machine for the destruction of cotton stubs which is adapted to be coupled to a tractor, comprising the respective pulling-off and cuffing stages, mounted on a single support frame that performs in a single path the pulling-off and the full fragmentation of the stub to 35-45 mm particles, forming a covering layer with the referred particles.

BRIEF DESCRIPTION OF THE DRAWINGS

The invention may be much more understood from the enclosed drawings, in which are represented the following figures.

DETAILED DESCRIPTION OF THE INVENTION

The "AGRICULTURAL MECHANIZED SYSTEM FOR PULLING-OFF AND CHOPPING STUBS OF COTTON PLANTS AND SIMILAR AGRICULTURES", object of this request of Invention Patent, applies to an agricultural machine (C) coupled to a conventional tractor, the prevailing feature of which is based on a mechanized system of extracting remains of plants buried in the soil, which are fragmented into particles and expelled under the formation of an inert organic material layer to protect the soil, in which the said machine (C) is preferably used in cotton plantations in any type of soil, basically comprising a set of plows (10), a chopper set (12) to chop stubs into a particulate material with a set of stubs extractors arranged between the plows and chopper sets (11) and co-operating among themselves, upon a single structure (2), thus allowing the cotton harvest with a much higher efficiency than the state-of-the-art equipment.

Figure 1:
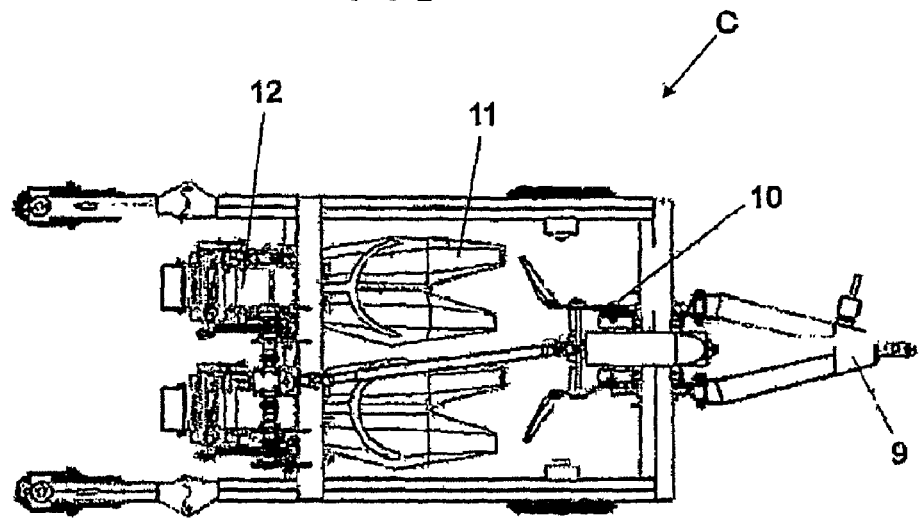
FIG. 1: Top view of a preferential attainment of the present invention machine with the three sets assembled in line.
Figure 2:
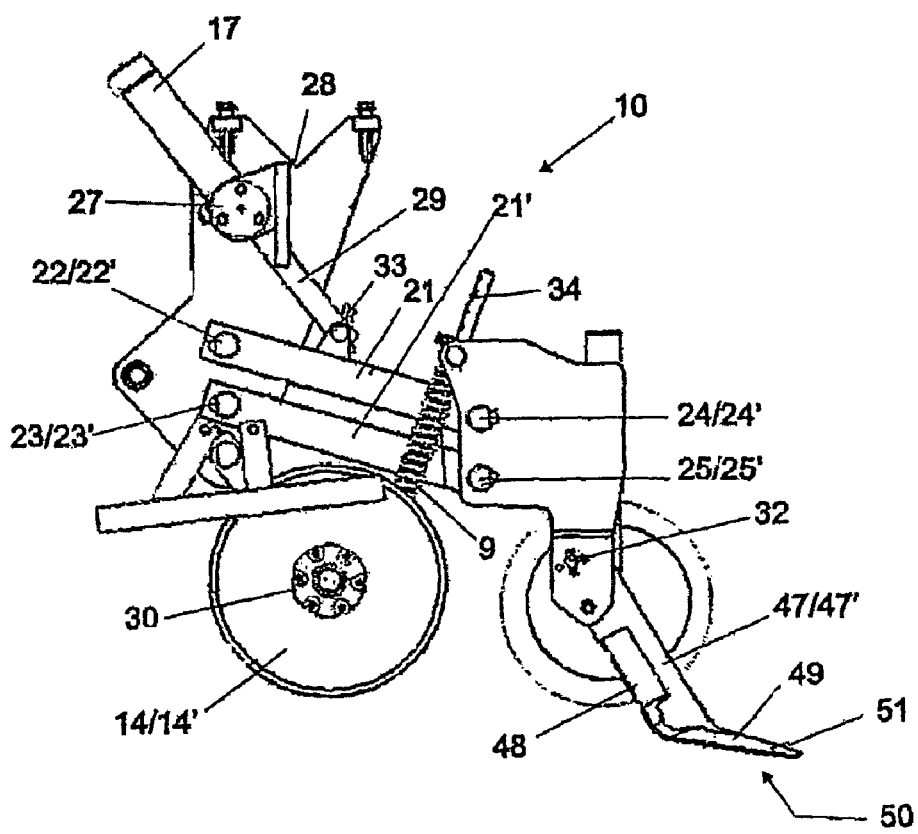
FIG. 2: Side view of the plowing module of the invention machine.

More particularly the machine (C) at issue, as demonstrated in FIGS. 1, 5, 6, 7, 8 and 9 are seen, which show the form of preferential attainment of the agricultural machine (C) as indicated in FIG. 1, for plowing, pulling-off and chopping of the cotton stubs of this invention for two lines.

The agriculture machine (C) of the invention, as demonstrated in FIGS. 5, 6, 7 and 8 is assembled on a rectangular metallic support frame (2) (FIG. 8), which in longitudinal direction is delimited in its ends by a front transverse bar (3) and a rear transverse bar (4), both separated by the respective axial side bars (5 and 6) joined to the transverse bars ends (3 and 4), supported on a pair of fixed front wheels (7) and one pair of rear wheels (8) with angle displacement connected to the support structure (2) in a conventional form.

The machine at issue is easily driven on a manual basis for coupling in a tractor by means of the pair of rear wheels (8) with angle displacement. The machine has a coupling device (9) to the tractor (not represented) for system drive along a row where all operations shall be performed on a single chassis or frame (2).

Three independent construction modules are assembled on the support frame (2) in communication by means of the stubs passage and which co-operate among themselves to perform the plowing, pulling-off and chopping operations in sequence, facilitating the formation of a fragmented stubs layer.

The first of the three modules is the plow set (10) fastened to the front transverse bar (3), which co-operates with the second module or stubs pulling of and transfer set (11), located between the axial bars (5 and 6) and the continuation of the latter and the third module or chopper set (12), assembled on the rear bar (4).

Figure 9:
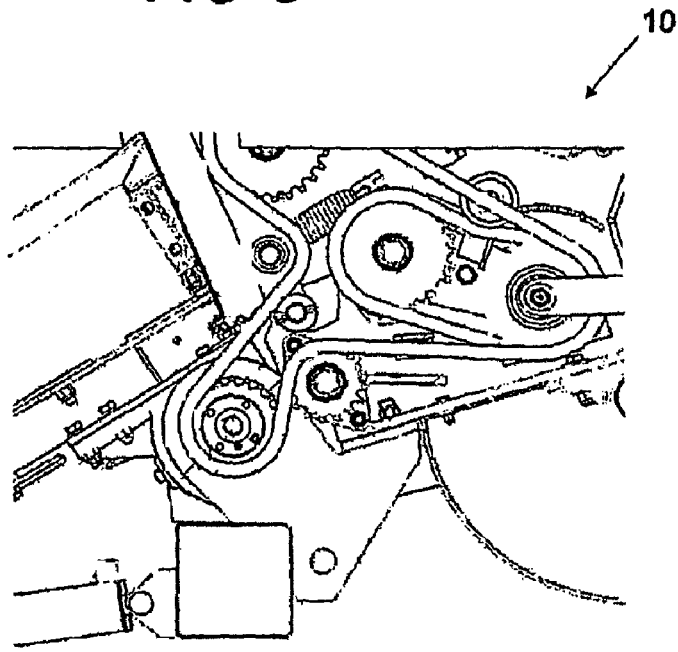
FIG. 9: Side view of a preferential attainment of the machine of this invention referring to FIG. 1.
Figure 10:
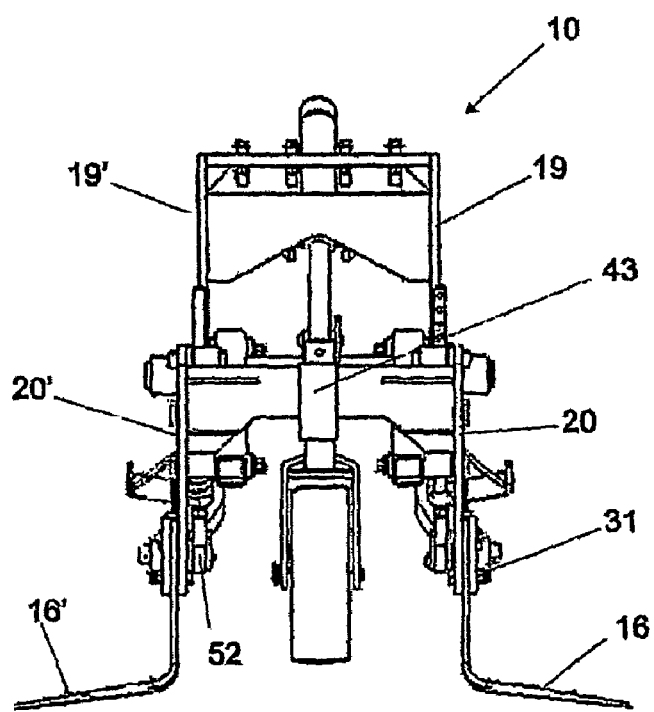
FIG. 10: Rear view of a preferential attainment of the machine of this invention referring to FIG. 2.
Figure 11:
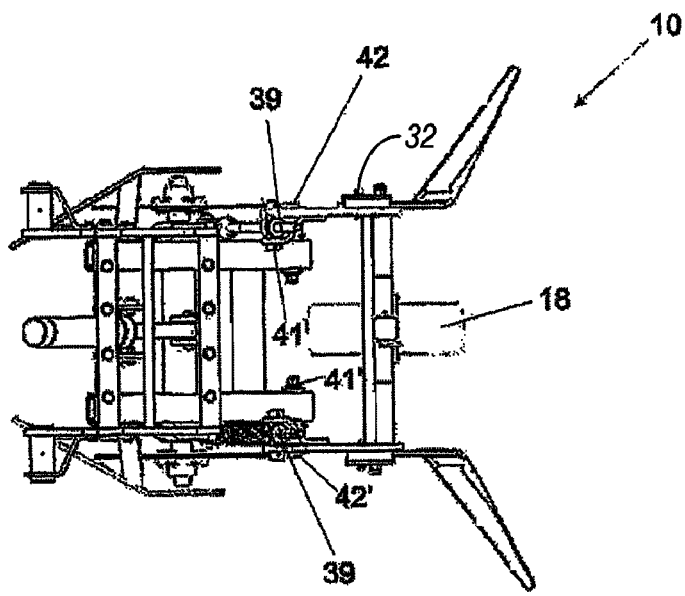
FIG. 11: Top view of a preferential attainment of the machine of this invention referring to FIG. 2.
Figure 14:
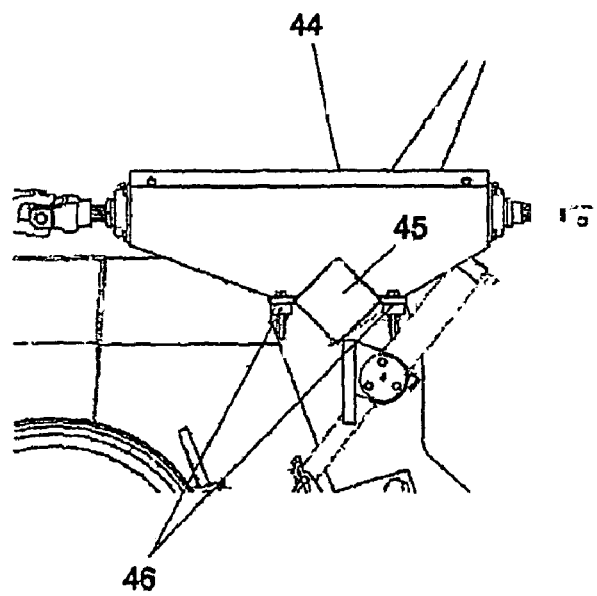
FIG. 14: Side detail of the plow module, referring to FIG. 2.

The three modules are fixed by conventional fasteners such as for example, clamps, bolts, nuts, "L" support plates, welded unions, etc. (FIG. 9 and FIG. 14).

The assembly in line of the plowing (10), pulling-off (11) and chopping (12) sets on the metallic support frame (2) with conventional mounting and fastening elements such as those illustrated as an example, offers among the multiple advantages the quick replacement of one of the modules for maintenance purposes, the expansion of the invention machine to operate in several lines simultaneously, that is, from a basic two-lines setup, to four or six lines.

As already demonstrated in FIGS. 2, 10, 11, 12 and 13, these are figures that show the plowing set (10) off the machine, as a replaceable module. For the preferential mode of the machine, as shown in FIG. 1, the plowing set (10) comprises an articulate structure formed by a first front pair of parallel vertical metallic support plates (19 and 19') and another rear pair of vertical metallic support plates (20 and 20'). Each front vertical plate (19 and 19') is joined to its corresponding rear plate (20 and 20') by the respective pairs of side arms (21 and 21') in an articulate form by means of pins (22 and 22'), (23 and 23'), (24 and 24') and (25 and 25') inserted in respective holes made in the vertical plates and in the end regions of the pair of arms (21 and 21'), thus setting a pantographic mechanism. A cutting wheel (14 and 14') is mounted on each side of the front pair of parallel vertical metallic plates (19 and 19'), in a spring-action mode by means of the respective adjustable course spring cushion (15 and 15') fastened in an articulate way to the corresponding rear plate (20 and 20'). A L-shaped plowing blade (16 and 16') is assembled on each vertical metallic plate (20 and 20') by means of a pair of bolts with nuts (31) with variable vertical angle positioning, forming attack angles selected by a breakable pin (32) to protect the blade (16) responsive to a hidden obstacle in the soil. A hydraulic cylinder (17) for the inclination of the pair of blades (16 and 16') against the soil, a wheel (18) in central position between and for depth penetration regulation of the pair of blades (16 and 16'), all these components assembled in an articulate form on the plowing set structure (10). The pantographic mechanism is intended to perform the rise e descent articulation of the blades (16 and 16') without changing their angular position, said blades reacting in response to the inclination force of the referred hydraulic cylinder (17) during the course.

The hydraulic cylinder (17) is mounted on a hinged base (27) fastened to a transverse union part (28) of the pair of rear plates (19 and 19'). The free distal end (29) of the hydraulic cylinder (17) is connected to a bearing formed on another transverse union part (33) of the pairs of side arms (21 and 21').

As mentioned, the blades (16) are L-shaped the vertical section of which (47) presents a cutting flank (48) aligned with the cuffing wheel edge (14 and 14') with an horizontal section (49) which converges to a free end (50) with a corresponding cutting flank (51) which tears the soil from below the stub radicular portion in transverse direction during the feed of the mechanized system, releasing the stub from its compacting state as well as the soil.

The cutting wheels (14 and 14') upstream the blades (16 and 16') are mounted on the respective hubs (30) with conventional rollers opening a groove for the passage of the vertical section (47 and 47') of the blade (16 and 16'). The cutting wheels' (14 and 14') range in height according to the terrains obstacles overcoming the spring action of the respective spring cushion system (15 and 15') with adjustable course.

The cushioning system (15) is comprised of a haste (34) the lower end of which (52) is connected to the respective hub (30) and the opposite end of which (35) crosses a ring (39) with a stud bolt (40), connected to the rear support plate (20 and 20'), to which the corresponding blade (16 and 16') is also connected.

The distal region (36) of the referred end (35) is provided with a sequence of recesses (37) for the regulation of the reciprocating movement of the cutting wheel (14). Therefore, the spring compression force and the clearance level of the cutting wheel is adjusted by the stud (40) on a selective basis in the desired recesses (37) (see FIGS. 12 and 13).

Figure 12:
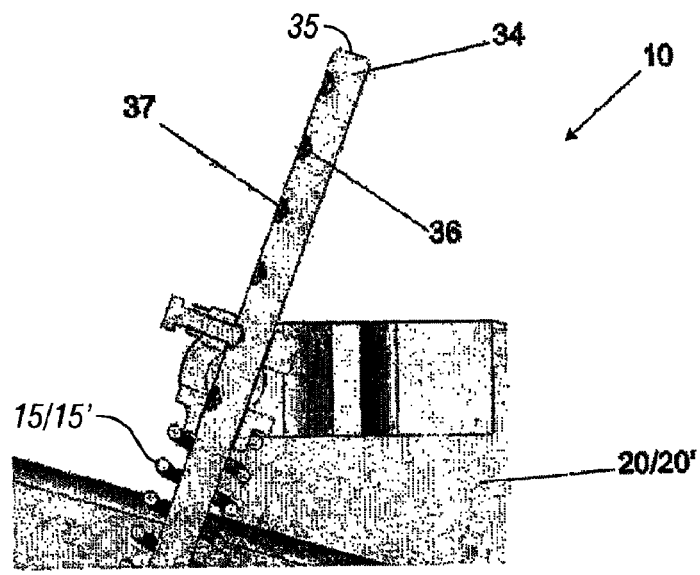
FIG. 12: Detail of the plow module adjustment, referring to FIG. 2.
Figure 13:
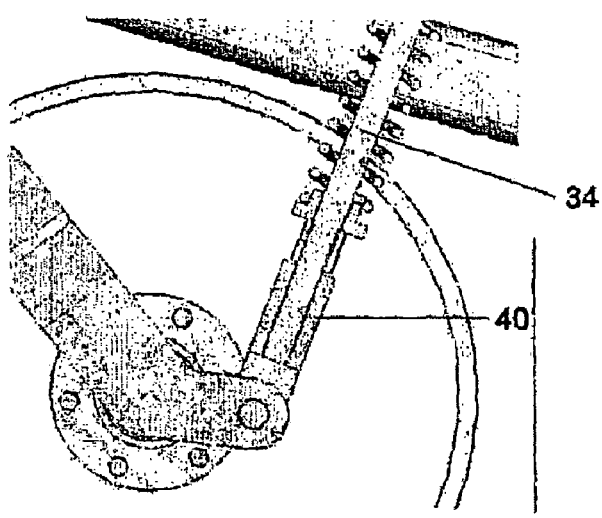
FIG. 13: Detail of the plow module cutting blade, referring to FIG. 2.

Externally to the cutting wheel (14 and 14') a sharp-cornered metallic stripe (41) is arranged by means of a pair of union parts (42 and 42') conventionally fastened on the outer side of each one of the rear support plates (19 and 19') intended to offset the stubs branches from the cutting wheel (14), which might interfere with the feed through the inner side of the cutting wheel (see FIGS. 12 and 13).

The wheel (18) is made in steel and rubber and is mounted in a central position and aligned between the blades (16 an 16') with regulation means (42) in its own support (43) to limit the blades depth (16 and 16').

Finally each one of the pair of support plates (19) presents in its top area (44) a V-shaped recess (45), a transverse pair of union parts (46) (FIG. 14) for the union of the plates (19) with fastening holes of the plowing module (10) to the front transverse bar (3) of the metallic support frame (2) as shown in FIG. 1 of the invention mechanized system.

FIGS. 3, 15, 16, 17 and 18 are seen, which detail the pulling-off set (11) installed by the pairs in the machine, as shown in FIG. 1, without one of its covers (68) for viewing the construction details.

As noticed, the pulling-off set (11) presents a rear area forming a capture orifice (64) and a front distal area (65) axially opposed to the first area of stubs transfer in communication with the chopper set (12). The rear area is delimited laterally by opposed walls (66 and 66') which are projected in a mutual spacing outwards, as a yoke.

Figure 3:
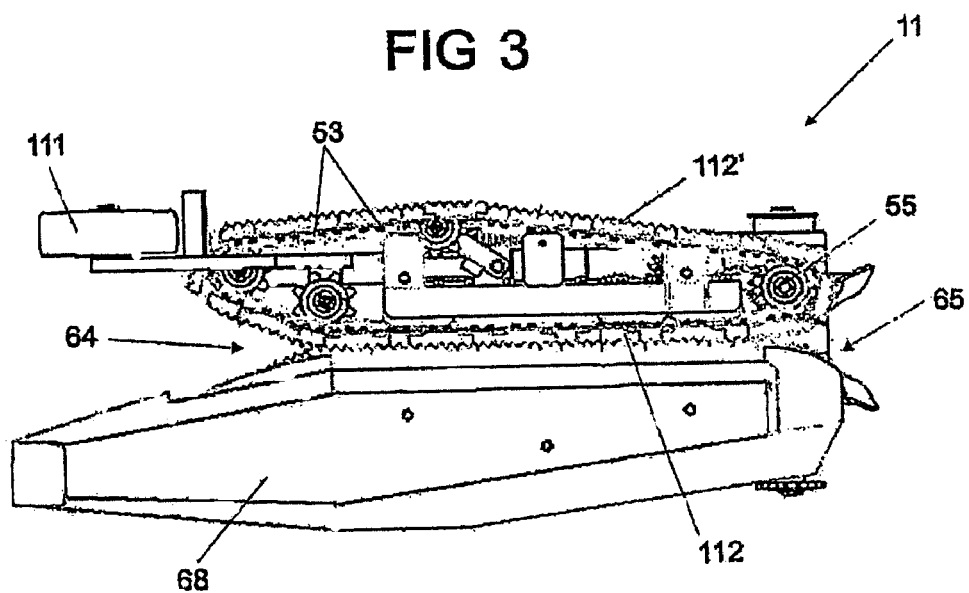
FIG. 3: Side view of the assembled root pulling-off and separating module.
Figure 4:
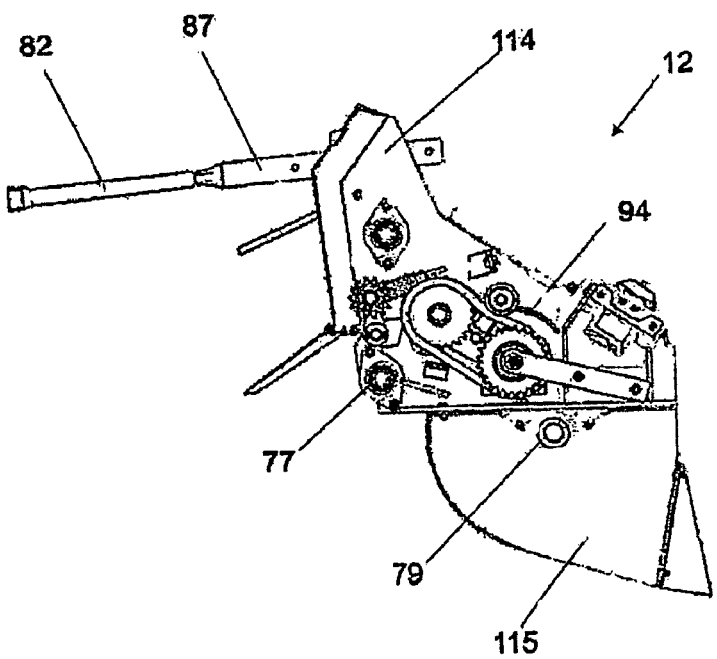
FIG. 4: view in perspective of the chopping devices arranged by pairs.
Figure 5:
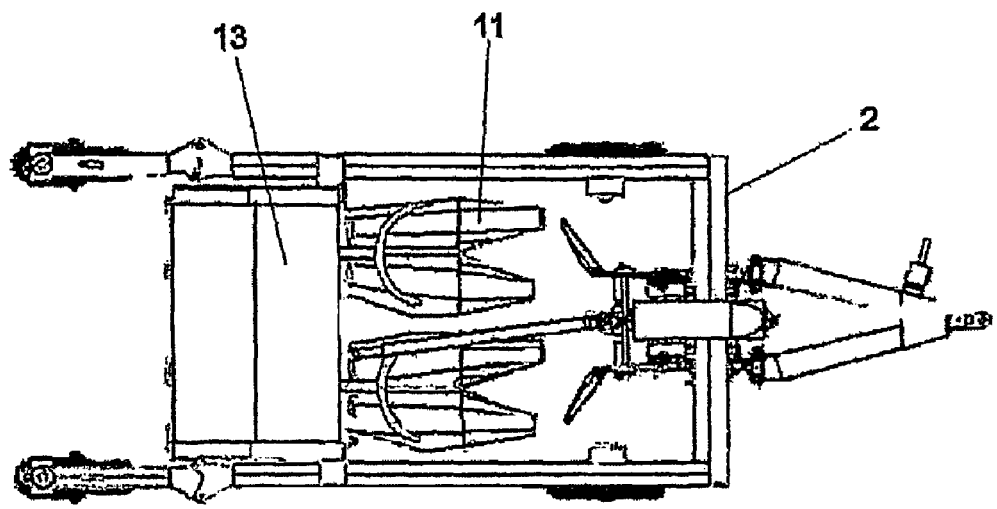
FIG. 5: Top view of a preferential attainment of this invention machine, referring to FIG. 1.
Figure 6:
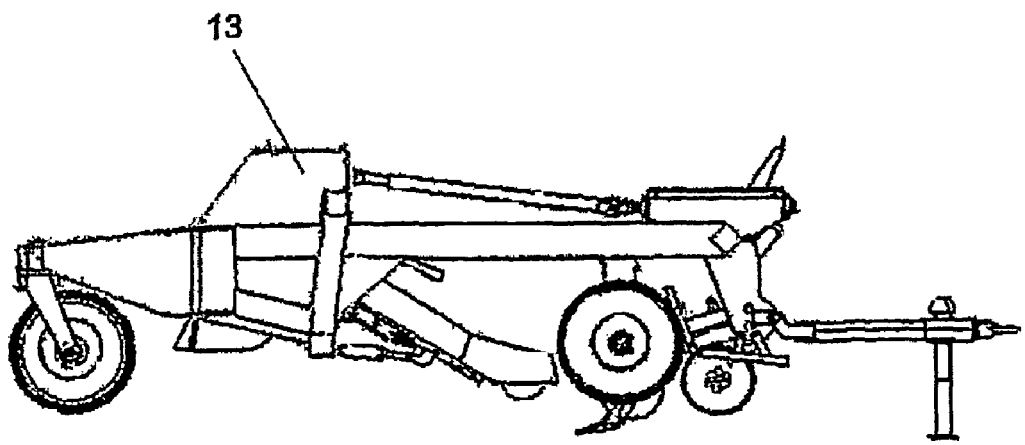
FIG. 6: Side view of a preferential attainment of the machine of this invention referring to FIG. 1.
Figure 7:
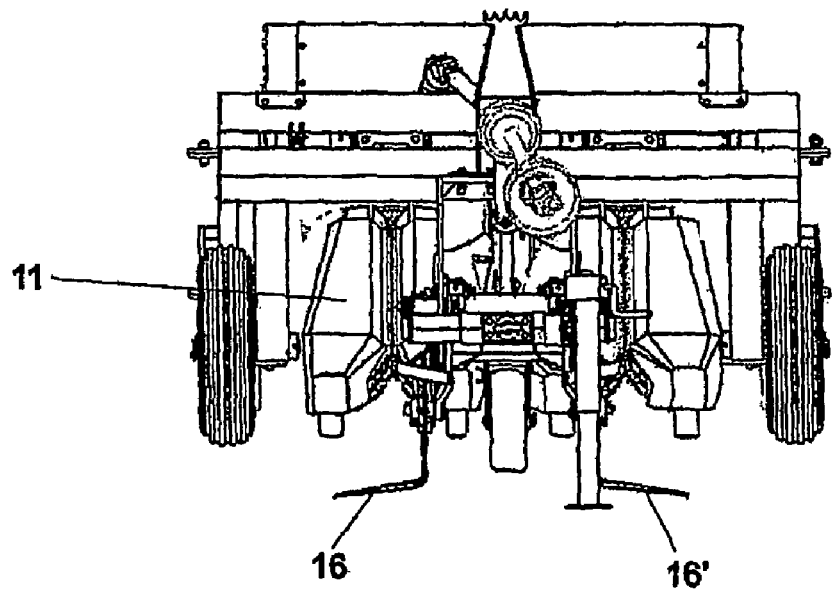
FIG. 7: Rear view of a preferential attainment of the machine of this invention referring to FIG. 1.
Figure 8:
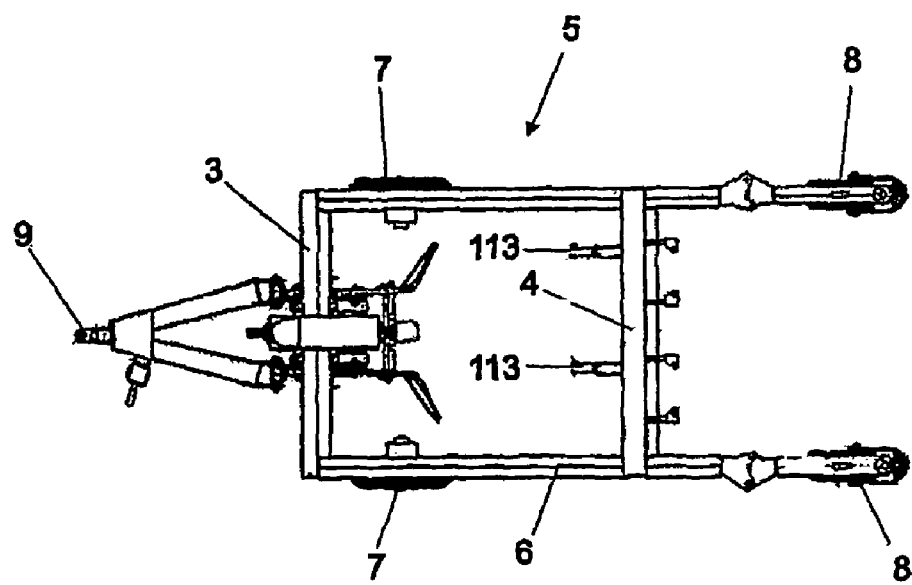
FIG. 8: Top view of a preferential attainment of the machine of this invention referring to FIG. 1.

Over and above, the pulling-off set of FIG. 3 presents the pair of chains (112 and 112') arranged side by side, in which the links are respectively provided with claws formed by hinged plates (53) forming a succession of hinged claws (53). The chains (112 and 112') are closed and are driven by respective pairs of pinions (55) located in the end regions.

Figure 15:
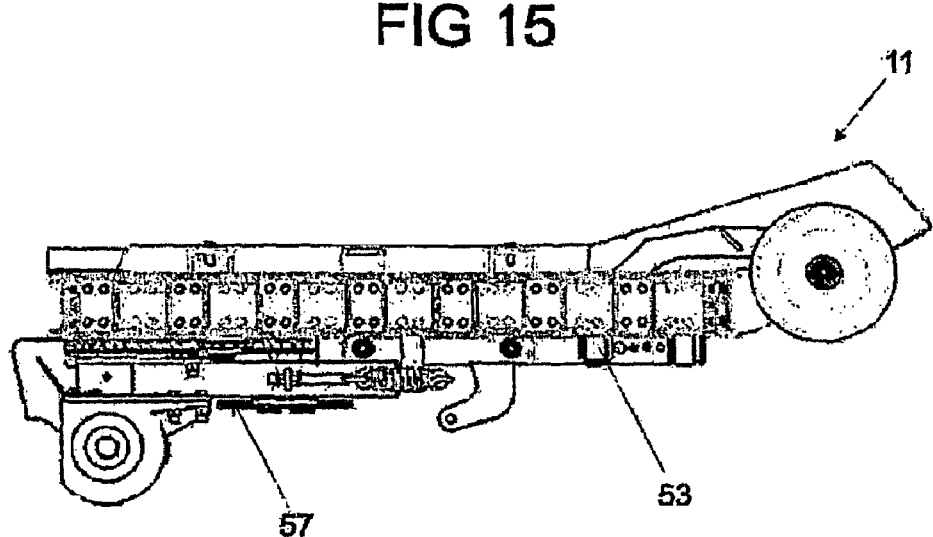
FIG. 15: Side detail of the root pulling-off module, referring to FIG. 3.
Figure 16:
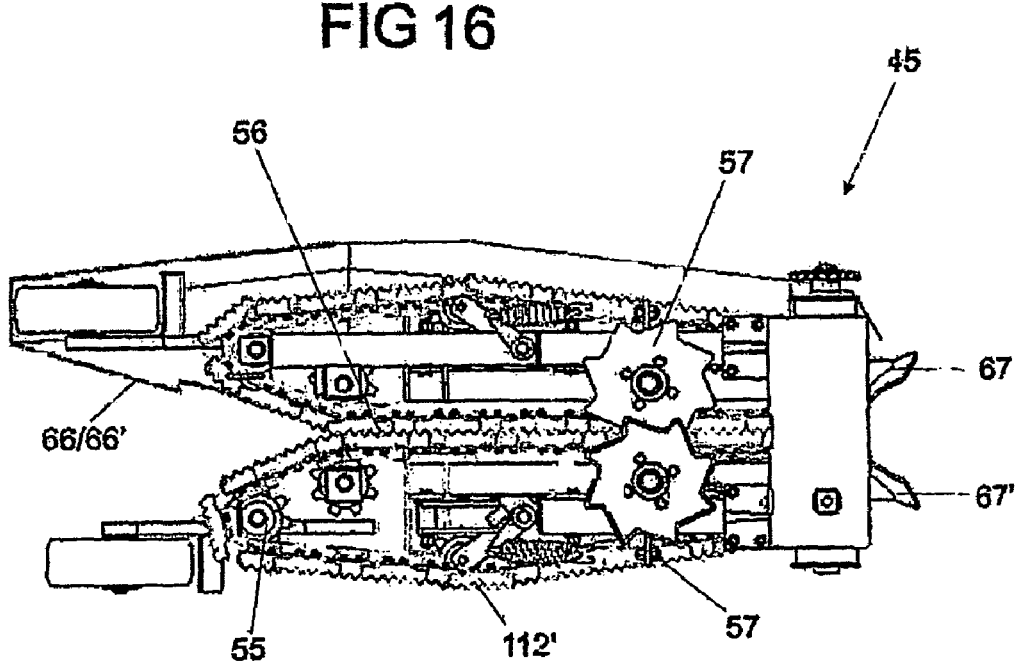
FIG. 16: Top view of the root pulling-off module, referring to FIG. 3.

As seen sideways, when installed in the machine shown in FIG. 1, the pulling-off set, FIG. 15 is mounted on a slanted basis, with the area rear to the ground supported on a pair of wheels (111) and the front area (67) at a higher level, mounted by conventional assembly means in communication with the capturing of the chopper set (12).

Figure 18:
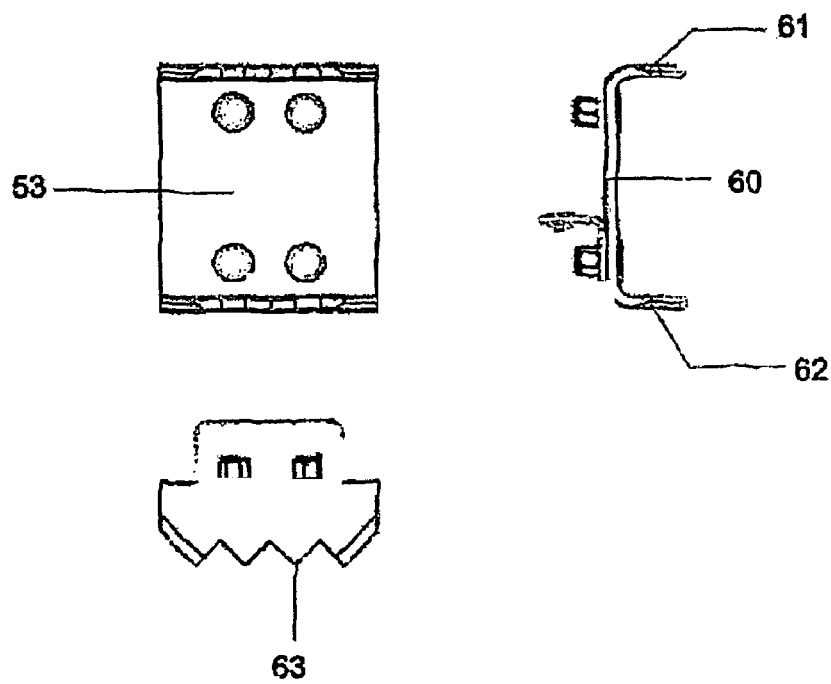
FIG. 18: Details of the root pulling-off module, referring to FIG. 3.

In FIG. 18, the hinged claw (53) presents a flat vertical body (60) with parallel top edge (61) and bottom edge (62) and turned under the formation of a straight angle in peripheral direction. Along the edges (61 and 62) there is a series of shoulders (63) preferably setup in saw teeth shape (63).

The flat body (60) is manufactured in plate or in limited flexibility material such as, for example, rubber the thickness of which provides a strength equivalent to that of a plate, with mounting holes to be trespassed by fastening elements too the respective chain link (112 and 112'). The hinged claw height (53) is the height required to cover substantially a length of the stem, having its height in the limit between 1,000 and 1,400 mm.

Simultaneously while one of the chains (112) turns clockwise and the other (112') turns anti-clockwise, in the capturing direction (64)—chopper set (12), the chains converge in the capturing area (64), leading the plates (53) to a mutual matching forming a mesh (56) which seize the stubs like a pinching of the stubs controlled by the chain strain, by means of horizontal springs.

From underneath, the pulling-off set (11) is provided with a pair of star-shaped rotating blades (57) mounted side by side with their centers mounted on the blade axle, parallel to the pinion shaft (55) in a respective form at the transfer area (65) at the rear of the chopper set (12) to cut the stem like a scissors above the radicular portion of the pinched stub in the mesh (56) in its displacement to the chopper set (12).

Figure 17:
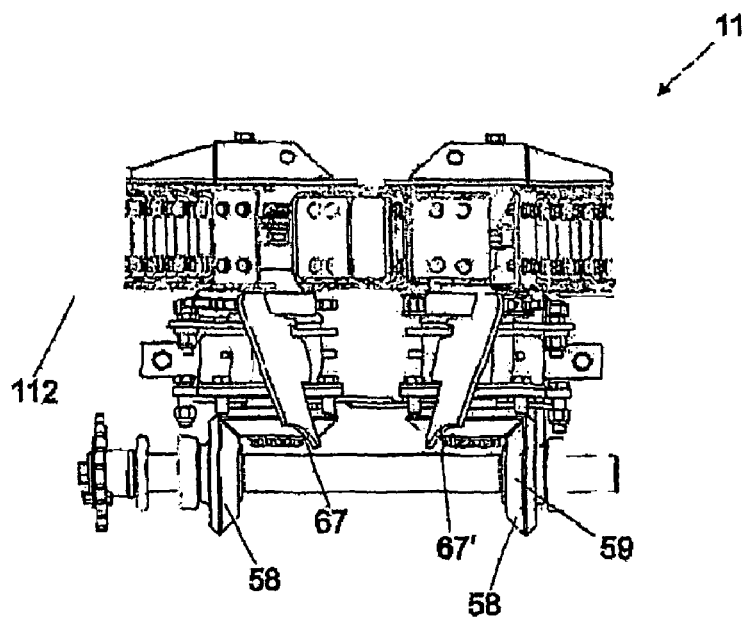
FIG. 17: Front view of the root pulling-off module, referring to FIG. 3.

The pair of chains (112 and 112') and the pair of rotating blades (57) operate in synchronism commanded by a set of synchronized gears (58) mounted inside an enclosure (59) in the rear area (65) and underneath the pulling-off set (11). (FIG. 17).

During the machine feed movement, the chains (112 and 112') turn at a higher speed forming the pulling-off set (11) such as a mobile pinching device the sequence of plates (53) which with the top and bottom teeth (61 and 62) capture and pinch the stub stem in the area (64), whose strength is to the pulling-off from the soil was eliminated by the action of the plowing blades (16 and 16') mounted in the plowing module (10) which acted underneath the radicular portion.

The walls (66 and 66') delimiting the yoke (64) compel the stubs to the mesh (56) to be pinched with a pinching force higher than the fastening force of the radicular portion buried in the ground, but this is not sufficient to cause the stem cutting, thus assuring the complete extraction of the stub.

The stubs are led by the mesh (56) along the pulling-off set (11) to the chopper set (12) in the rear area, at an adjustable speed 50%-100% higher than the machine running speed, transferring the stub into de chopper set (12) where it is chopped into 3545 mm particles, being ejected through an unloading opening located at the machine base, forming a covering layer of inert organic matter.

However, before entering the chopper set (12), the radicular portion of the stem pinched by the top and bottom edges (61 and 62) of the plates (53) in the mesh (56), presenting an entanglement of earth and stones is sectioned by the pair of rotating blades (57) mounted from underneath, hindering its entry into the chopper set (12) and thus removing the early wear and the locking seen in the conventional machines (FIG. 18).

Due to the soil irregularities an offset hydraulic system (113) is foreseen which is connected to the pulling-off module (11) and the metallic frame (2) which reacts against the wheel sinking (111), returning the pulling-off set (11) to its initial height as regards the soil and assuring that the rotating blades (57) cutting is performed above the radicular portion.

On the rear area (65) of the pulling-off set (11), at the transition location or communication with the chopper set (12) there are in both sides, a respective baffle (67 and 67') which prevents that the stubs released by the mesh (56) in area (65) fall off the machine.

FIGS. 4, 19, 20, 21, 22 and 23 are seen, which detail the chopping sets arranged by pairs in the machine shown in FIG. 1. The chopper set (12) is formed by a transversally split body defined as a top housing (114) which contains an impeller stage and a bottom housing (115) which includes a chopper stage, both housings being in communication or hollow inside.

On the front view of the chopper sets the top housing (114) is formed by parallel opposed vertical walls (70, 71) a top wall (92), with the open front side, forming an intake for the stubs (72), a closed rear side and the hollow bottom side in communication with the bottom housing (15).

Within (114) it houses a set of cylinders forming the impeller stage, arranged on a horizontal basis and at a different height among themselves, the ends of which are supported by pairs of bearings (77 and 79) fastened to the side walls (70 and 71).

An impeller cylinder (74), a pressing cylinder (75) and a counter-support cylinder (78) operated by a driving set (80) on the wall (71), with which a pair of parallel rods (81) and a bifurcate arm co-operate, as auxiliary guiding elements mounted on a hinged basis and externally through the stub (72) intake side forming a yoke (82), which guide and compress stubs received from the mesh (56) of the pulling-off set (11).

Figure 19:
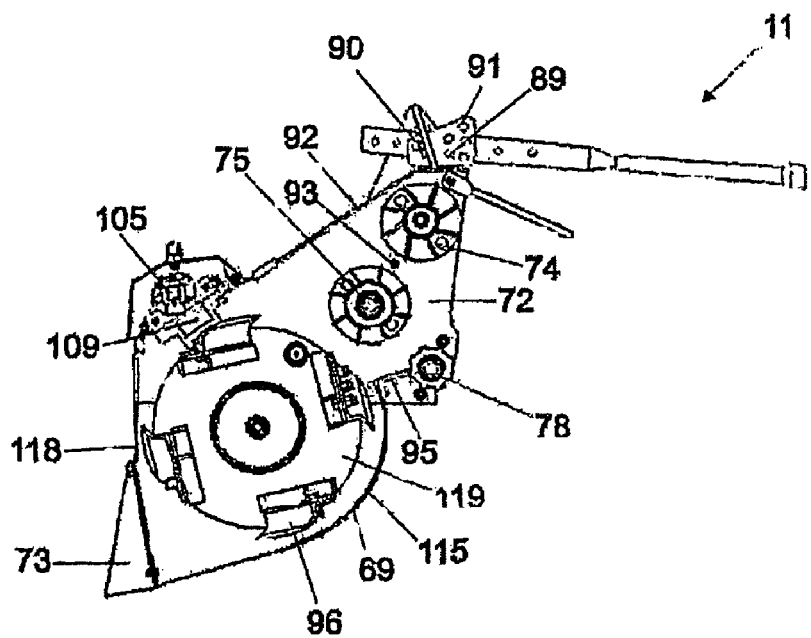
FIG. 19: Side detail of the plow module, referring to FIG. 4.
Figure 20:
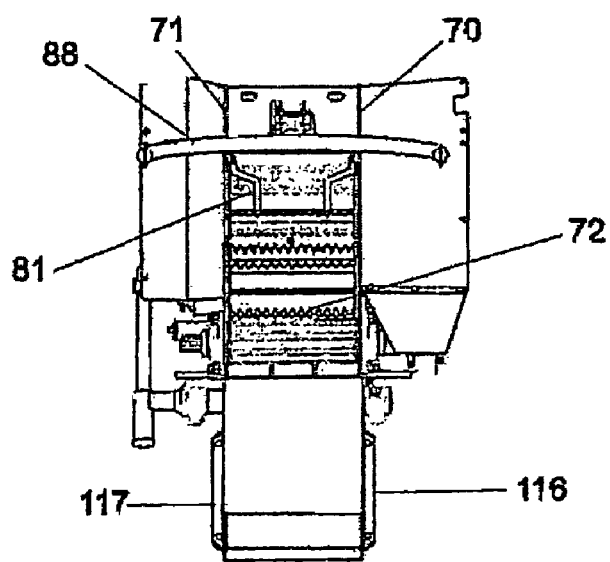
FIG. 20: Top view of the plow module, referring to FIG. 4.

The bottom housing (115) comprises a pair of parallel opposite vertical walls (116 and 117), a rear curved wall (69) which extends itself on a curved basis to the bottom side between the side walls (116 and 117) edges and that with a rear plate (118) delimit the unloading spout (73) of stubs fragmented by the chopper rotor (119) seen in FIG. 19.

The propelling stage is formed by cylinders (74 and 75) and the auxiliary guide elements (81); cylinder (74) is located at a fixed height aligned and transversally to the mesh (56) outlet of the pulling-offset (11) located upstream.

The involving wall (83) of cylinder (74) is provided with a radial distribution of fins with their axial interpolated teeth (84 and 84') with a constant height toothed edge (85). The cylinder ends are finished by the respective intersecting walls of the circular ring (86) which give the cylinder (74) the shape of a spool. (FIG. 12).

The first auxiliary guide elements (81) set up as straight rods that converge on a sharp-cornered way to the mesh (56) outlet, are located at a position above the cylinder (74) and fastened to the side walls (70 and 71), forming a side barrier to compress and lead the stems to the cylinder (74).

Over and above the referred rods (81) and at a higher distance, the second auxiliary guide element (82) is projected, formed by a bar (87) with a semi-ring (88) at the distal end like a yoke (82), the bore of which substantially corresponds to the pulling-off set (11) width, intended to embrace and drop the stubs over the cover (68) of the pulling-off set (11).

The yoke (82) is fastened in a pivoting form to a support of vertical walls (89) provided with a combination of borings (90 and 91) for linear and angular regulation of the yoke (82), said support (89) being built-in the top wall (92) arranged transversally between the side walls (70 and 71) and joined to them.

The pressing cylinder (75) has constructive features that are identical to the propelling cylinder (74), but it is mounted in a feed and return oscillating form, controlled by a spring regulation device (94) fastened to the side wall (71).

The counter-support cylinder (78) is mounted ahead and underneath the pressing cylinder (75) and its involving wall co-operates with several blades known as rotor blades (119) which along with the counter-blades (95) cause the cutting (chopping), located in an opposed relation to the same and in a parallel form.

Figure 23:
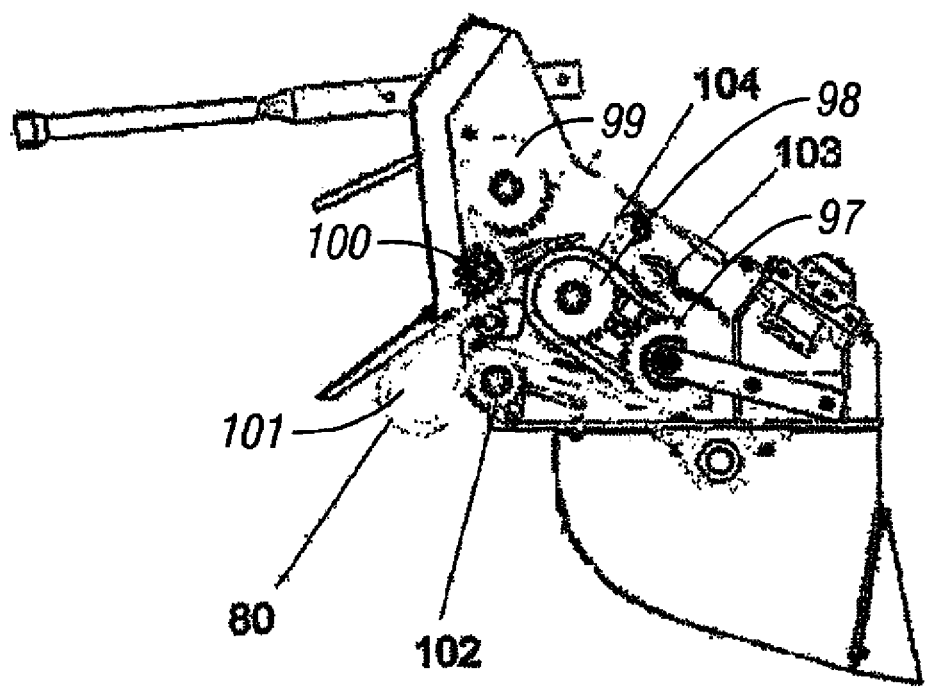
FIG. 23: Detail of the plow module, referring to FIG. 4.

The driving set (80) comprises a conventional constructive implementation of multiplying and demultiplying gears (97 to 102) respectively mounted at the end of the cylinders rotation shaft and driven by a first and/or second toothed chain (103 and 104) (FIG. 23).

Simply and inventively, a propelling force it is created by means of the yoke (82) compression force upon the stubs retained in the mesh (56), selected from the combination of borings (90 and 91), which triggers the stubs against the cylinder (74) when they are released in front of the intake area (72), being pulled by the cylinders (74 and 75) rotation with their toothed fins (83) by means of an interval (93) formed between the propelling cylinder (74) and the pressing cylinder (75).

Inside the bottom housing (115), the chopping rotor (119) above the unloading spout (73) is provided with a distribution of blades (96) arranged axially forming alternate angles as regards their own shaft. Such distribution has shown to be extremely useful to prevent the unilateral wear evidenced in the state-of-the-art equipment, also enabling the stem cutting into smaller sections.

The distribution of the cylinders and the blades (96) allows a load concentration towards the center of the chopping rotor (119) by means of which and by means of the blades (96) the stubs are chopped and ejected by the discharge (73) driven by the centrifuge force against the curved wall (69) by the bottom area upon the ground, thus obtaining a layer of inert organic matter on the soil.

Figure 21:
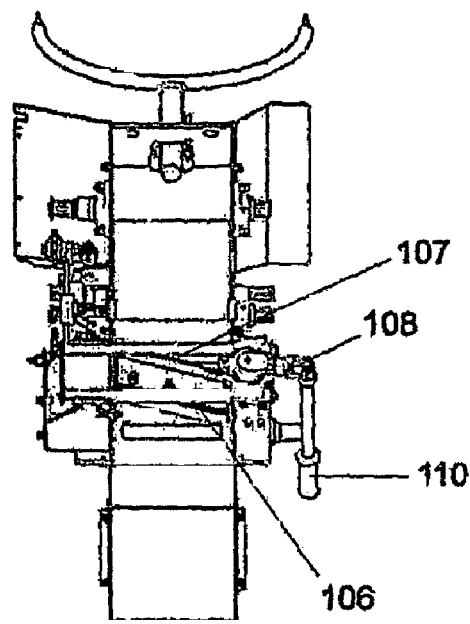
FIG. 21: Detail of the plow module, referring to FIG. 4.
Figure 22:
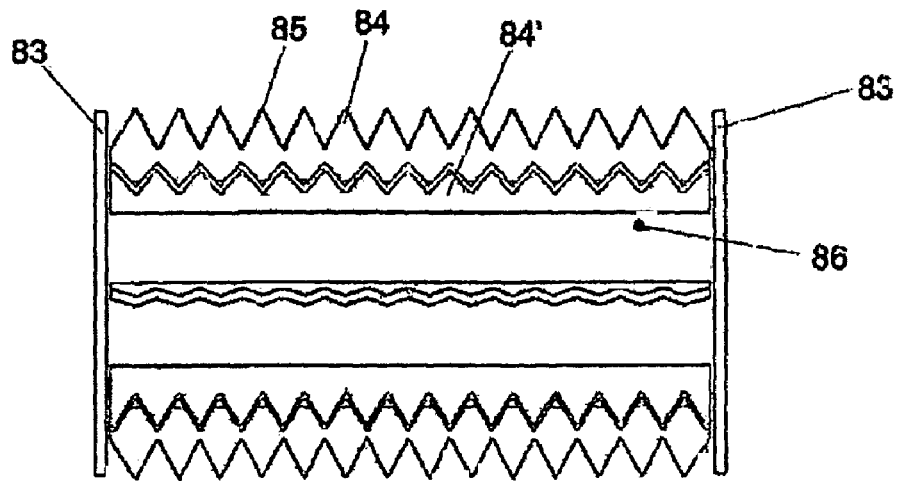
FIG. 22: Detail of the plow module, referring to FIG. 4.

A grinding set (105) is mounted at the top rear part of the discharge (73) accessed by the cover (13) and allows the chopper rotor (119) blades to be directly grinded in the machine. The set is formed by parallels bus bars (106 and 107) upon which a moving block (108) is displaced in a rectilinear way to which an adjustable grindstone (109) is mounted, manually driven by a lever (110). (FIGS. 19 and 21).

Although the invention has been described based on the constructive stages shown in the figures in a preferential mode, equivalent constructive stages may be implemented. As an example, the pulling-off set (11) whose concept is the use of a mesh (56) formed by the mating of the hinged plates (53) fastened to a respective link of each chain (53) might be replaced by a pulling-off system and helical carriage as seen in the patent PI-0107574-5 request of the same depositor, formed by two parallel axles provided with mated helical threads, which could be mounted with some adaptations from underneath covers similar to those indicated with reference (68) in FIG. 1 or 3.

Likewise, although the presented application is directed to the cotton culture, the mechanized system of this invention may be employed in all those cultures whose plant is formed by a hard stem and a radicular portion firmly buried in the ground, mainly in hard soils, where it becomes necessary to assure the full pulling-off of the radicular portion with high productivity and excellent cost x benefit ratio.

Finally, the invention was described based on a preferential form among the possible forms of attainment, being subject to variations and changes by which its reach is not limited to the details accurately set forth in the examples.

The invention claimed is:

1. An agricultural mechanized system for pulling-off and chopping stubs of cotton plants and similar agricultures, which applies to an agricultural machine (C) coupled to a conventional tractor (T), the prevailing characteristic of which is based on a mechanized system for extracting remains of plants buried in the ground, preferably cotton and similar agricultures, presenting in a preferential attainment a machine provided with a support frame (2) with a front part (3), a rear part (4), a pair of transversally opposed parallel sides (5 and 6) which extend themselves axially between the ends of the referred front and rear parts (3 and 4) and on an adjoining basis to these over at least a pair of wheels (7 and 8); the system comprising:

a plowing set (10) at the front area (3) provided with a pair of cutting wheels (14 and 14') a pair of adjustable plowing blades (16 and 16') between a first position above the ground and a final position of penetration in the ground, which is longer than the stubs radicular portion depth; a chopper set (12) with blades (96) which chop the referred stubs into a particulate material inside a housing at the rear area (13);

a pair of front vertical plates operably connected to the tractor, a pair of rear vertical parallel plates operably connected to the plowing blades, and two pairs of parallel side arms linking the front vertical plates to the rear vertical plates whereby the plowing set (10) is mounted by a parallel linkage system of variable positioning;

at least a stub pulling-off set (11) arranged between the referred plowing set (10) and chopper set (12) and in communication with these by transfer of stubs from the front area (3) to the chopper set (12) housing and a universal movement system (9) operatively for the synchronous movement of the referred plowing set (10), pulling-off set (11) and chopper set (12), wherein the pulling-off set (11) comprises a circulating stub pinching device (52, 53 and 56) along the pulling-off set and a pair of rotating blades (57) with supplementary cutting edges for the cutting of the radicular portion of the referred stubs.

2. The agricultural mechanized system for pulling-off and chopping stubs of cotton plants and similar agricultures, according to claim 1, characterized by the fact that the referred pair of cutting wheels (14 and 14') is connected to the pair of front vertical parallel plates (19 and 19') mutually spaced and hinged to the pair of rear vertical parallel plates (20 and 20') mutually spaced provided with the referred pair of plowing blades (16 and 16') for the responsive movement of retraction and penetration in the ground with the pair of cutting wheels (14 and 14').

3. The agricultural mechanized system for pulling-off and chopping stubs of cotton plants and similar agricultures, according to claim 2, characterized by the plowing set (10) comprising a surface sensing device (18) to control the referred plowing blades (16) depth.

4. The agricultural mechanized system for pulling-off and chopping stubs of cotton plants and similar agricultures, according to claim 2, characterized by the fact that the rear vertical parallel plates (20 and 20') have angular positioning regulation means for regulating the angular positioning of the plowing blades (16 and 16').

5. The agricultural mechanized system for pulling-off and chopping stubs of cotton plants and similar agricultures, according to claim 2, characterized by the fact that the pair of plowing blades (16 and 16') includes a spring device (15) with a rod (34), with one of its ends (52) operatively coupled to the cutting wheel (14 and 14') and the axially opposed end (35) with a coupling area to a fastening point (38) limiting the spring course in the front vertical parallel plates (20 and 20') bearing the plowing blades (16 and 16').

6. Agricultural mechanized system for pulling-off and chopping stubs of cotton plants and similar agricultures, according to claim 1, further comprising a mesh system (56) that includes a pair of chains (52 and 52') provided with hinged claws (53) provided with several shoulders (63) which co-operate among themselves.

7. The agricultural mechanized system for pulling-off and chopping stubs of cotton plants and similar agricultures, according to claim 6, characterized by the fact that the mesh system (56) moves at a higher speed than the equipment running speed.

8. The agricultural mechanized system for pulling-off and chopping stubs of cotton plants and similar agricultures, according to claim 1, characterized by the fact that the chopper set (12) comprises a stub propelling device (82), a first stage of propelling cylinders (74, 75 and 76) co-operating with a second stage of chopper cylinder and chopping devices (95 and 96) by a driving set (80) formed by gears (97, 98, 99, 100, 101 and 102) and chain (103 and 104) and a discharge spout (73) directed towards the ground in a substantially perpendicular sense.

9. The agricultural mechanized system for pulling-off and chopping stubs of cotton plants and similar agricultures, according to claim 1, further comprising a first claw element (53) that has a substantially flat wall with coupling means to a chain for use in a stub pulling-off system and with at least an edge region (61 and 62) which presents a series of shoulders (63) to be conjugated with another series of shoulders of a second claw element positioned ahead the first claw element (53), for pinching the stubs in the referred stubs pulling-off system.

\* \* \* \* \*